United States Patent
Afdahl et al.

[15] 3,676,981
[45] July 18, 1972

[54] TREATMENT OF HYDROCARBON GASES

[72] Inventors: Ronald L. Afdahl; Harold W. Barber, both of Bartlesville, Okla.

[73] Assignee: Phillips Petroleum Company

[22] Filed: Feb. 24, 1971

[21] Appl. No.: 118,411

[52] U.S. Cl. .................................................55/30, 55/171
[51] Int. Cl. ...........................................................B01d 53/14
[58] Field of Search ..............................55/29–32, 171–177; 260/676 H

[56] References Cited

UNITED STATES PATENTS

| | | | |
|---|---|---|---|
| 2,812,830 | 11/1957 | Sattler et al. | 55/31 |
| 3,254,473 | 6/1966 | Fryer et al. | 55/32 |
| 3,347,019 | 10/1967 | Barnhart | 55/32 |

*Primary Examiner*—Charles N. Hart
*Attorney*—Young & Quigg

[57] ABSTRACT

A process for treating hydrocarbon streams comprising methane, ethane and higher boiling fractions which comprises separating the stream into vapor and liquid components; separately cooling the vapor and liquid components; adding to the vapor stream prior to the ultimate cooling stage a desiccant material; and recontacting the chilled liquid and vapor streams in a contact zone. The described process enhances the quality of the separated vapor stream and the recovery of gas hydrate inhibitor chemicals from hydrocarbon gas stream under superatmospheric conditions to which such inhibitor chemicals have been added to inhibit formation of gas hydrates.

10 Claims, 1 Drawing Figure

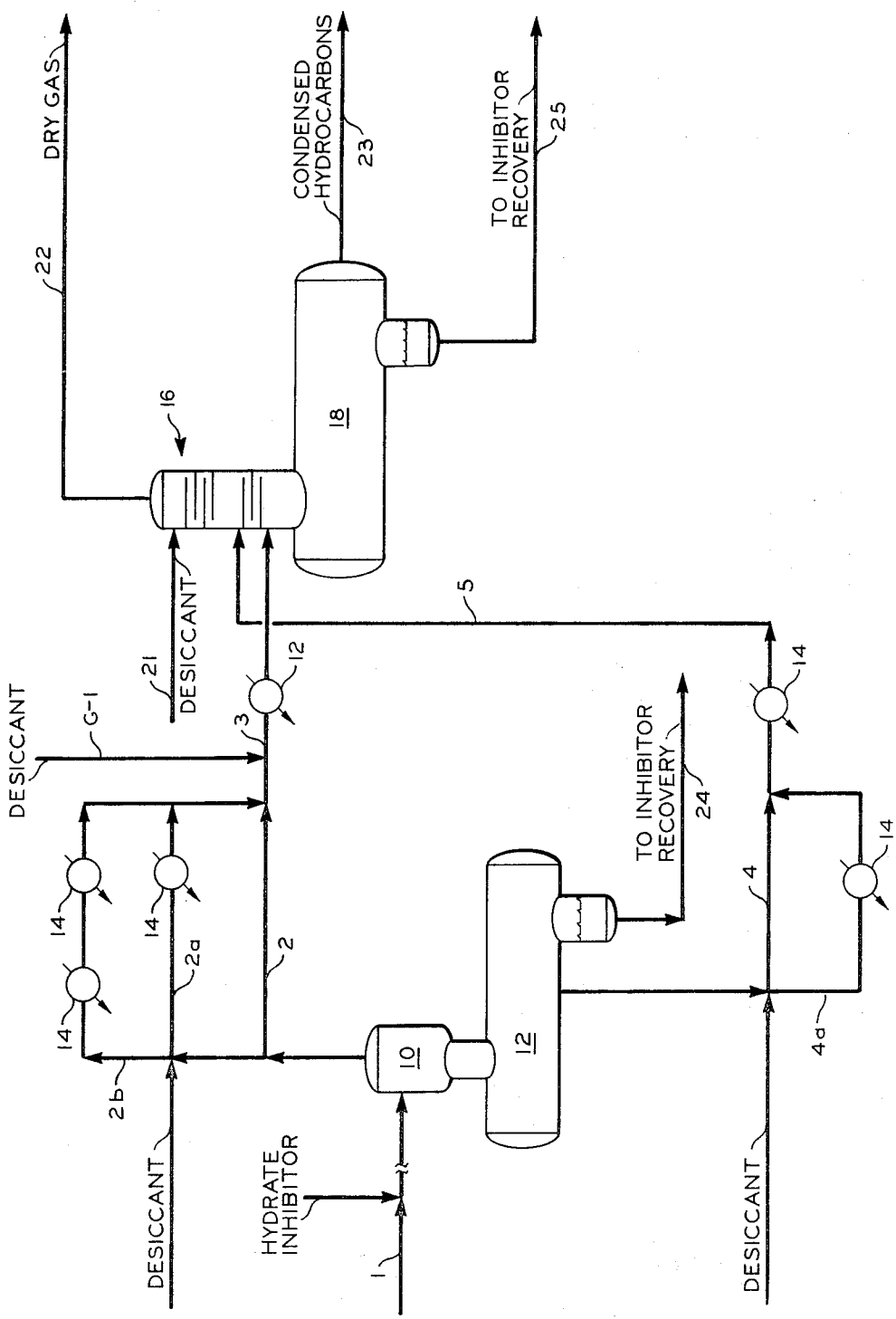

TREATMENT OF HYDROCARBON GASES

This invention relates to the treatment of hydrocarbon gases. Particularly, this invention relates to the treatment of natural gas-liquids streams under superatmospheric pressure to enhance the separation of methane from ethane and higher boiling fractions and, more especially, to the recovery of gas hydrate inhibitor chemicals from natural gas-liquids stream under superatmospheric conditions to which said chemicals have been added to inhibit formation of gas hydrate.

Hydrocarbon gases, whether produced from natural gas wells, condensate wells, or in association with crude oil, generally comprise a mixture of methane, ethane, propane, butanes, pentanes and higher paraffinic hydrocarbons. These mixtures are processed so as to deliver to industrial and residential markets high purity methane for fuel. The ethane and higher boiling fractions, while possessing a higher heat value than the methane, can be used to greater economical advantage as gasoline blending agents and chemical intermediates for the production of other organic materials such as ethylene, propylene, polymers and the like. These hydrocarbons as produced generally contain impurities which must be removed before the gas can be sold. A significant impurity is water which leads to the formation of hydrates and the plugging of transmission equipment. In order to maximize operating economics, it is generally desirable to remove the impurities including the water and effect a separation of the ethane and higher boiling components from the fluid in order to deliver to the pipeline a dry gas enriched in methane while retaining the ethane and higher components for other purposes. Glycols, methanol and the like have been used to inhibit hydrate formation in flow lines by direct injection into the hydrocarbon system. Glycols and methanol have been found to be the most effective inhibitors and are the most widely used. Because of the cost of these inhibitor chemicals numerous processes have been developed to optimize the amount of inhibitor added to such systems and to improve the recovery of the inhibitor chemical. Generally, such processes treat the wet gas stream by injecting the inhibitor into the wet gas stream and the thus-treated wet gas can be passed through an expansion valve and into a gas-liquid separator where a portion of the inhibitor and water is separated as liquid together with any condensible hydrocarbons. Inhibitor-water mixture as separated from the liquid hydrocarbons can be treated to recover the inhibitor for reuse in the system. The liquid hydrocarbons can be separated into the various hydrocarbon fractions. The liquid hydrocarbons, at least in part, can be recontacted with the vapor or gas components as in an absorption column to separately recover the substantially dry gas overhead comprising methane and a liquid hydrocarbon bottoms stream comprising ethane and heavier hydrocarbons. While such processes are effective in inhibiting the formation of gas hydrates, a not inconsiderable amount of expensive inhibitor chemicals are not recovered because of losses due to solution in condensate, vaporization and the carry-over in the gasoline, and separation problems encountered in the regenerator apparatus. The product streams exiting, for example, the absorption column, generally find the overhead vapor dry gas stream to contain sufficient vaporized ethane and heavier hydrocarbons to require adjusting the BTU content of the overhead gas stream to meet the pipeline heat specifications.

It has now been discovered that the recovery of hydrate inhibitor, when such chemicals are necessary, from natural gas liquids and petroleum refining streams cannot only be improved but also that the methane concentration of the vapor product separated from such streams can be increased and the ethane and heavier hydrocarbon content of the dry gas product separated from such streams can be reduced by a process which comprises separating the incoming hydrocarbon stream into vapor or gas and liquid components; separately cooling hydrocarbon stream into vapor or gas and liquid components; separately cooling the vapor and liquid components; adding to the vapor component prior to the ultimate cooling stage a desiccant material and recontacting the chilled liquid and vapor streams in a contact zone by countercurrent contact using a vapor-liquid absorption tower. In a preferred embodiment, there is added to the liquid hydrocarbon stream exiting the vapor-liquid separator, a desiccant material at least prior to the final cooling stage. In a still further preferred embodiment, desiccant material is also added to the contact tower near the upper end of said tower.

In accordance with the invention, the vapor or gas effluent from a gas-liquid separator is treated by cooling the vapor, adding to the vapor effluent at least prior to the final cooling stage a desiccant material such as ethylene glycol (or aqueous ethylene glycol, depending on temperatures used), and introducing the cooled vapor effluent from the ultimate cooler into a contact tower at a point intermediate the column where it is contacted by cooled liquid introduced into the column at a locus above the point of entry of the cooled gas; the cooled liquid having been obtained by cooling the liquid effluent stream from the gas-liquid separator to a temperature approximately equal to that of the vapor stream as it enters the contact tower. In a preferred embodiment, a desiccant such as ethylene glycol is admixed with the liquid hydrocarbon stream exiting the vapor-liquid separator. In a still further preferred embodiment, a desiccant such as ethylene glycol is introduced into the contact column at a locus above the point of gas entry and preferably at a locus above the point of liquid entry.

It is a particular feature of the invention that the vapor stream from the gas-liquid separator will pass through at least one heat exchange for chilling. Thus, according to this invention, the natural gas-liquids stream containing condensible hydrocarbon is charged to a vapor-liquid separator. A desiccant material is added to the vapor stream recovered from the gas-liquid separator. The desiccant-containing vapor stream is cooled and charged to a contact zone. The liquid effluent from the separator is cooled to a temperature in the range of the temperature to which the vapor stream has been cooled prior to its introduction into the contact zone. The chilled liquid stream is then introduced into the contact zone at a locus above the point of gas entry. Preferably, the vapor effluent from the separator is chilled stagewise and the desiccant material added at any time prior to the ultimate cooling stage, with inhibitor addition just before the chilling stage being necessary to minimize formation of gas hydrates. It is preferred to add a desiccant material into the liquid effluent from the separator prior to chilling the liquid stream. In a particular preferred embodiment, the chilled desiccant material is added to the contact zone at a locus at least above the point of gas entry and preferably above the locus of liquid entry. The invention is particularly suited for treating gas streams containing water vapor. In such cases, a hydrate inhibitor is added to the wet gas stream prior to any cooling of the stream and charging the stream to the vapor-liquid separator. Under these conditions, the natural gas-liquids stream forms an upper layer of liquid hydrocarbons and a lower layer of hydrate inhibitor-water mixture. The liquid layers are separated by known means, and the liquid hydrocarbon is chilled and charged to the contact zone in accordance with the invention. The gas stream from the separator which has been separated from the major portion of the water, hydrate inhibitor and condensible hydrocarbons contained in the charge to the separator is treated in accordance with the invention by cooling, preferably in stages, with addition of desiccant before single-stage chilling of the stream or before the final cooling stage when stagewise cooling is employed.

It is a particular feature of the invention that the vapor stream from the gas-liquid separator have added thereto a selected desiccant prior to introducing the cooled vapor into the ultimate chilling stage and that the liquid stream from the gas-liquid separator be cooled to a temperature approximately equal to that of the cooled vapor component as it enters the contact column. Optionally, the liquid hydrocarbon effluent from the gas-liquid separator can have added thereto the desiccant material before the liquid effluent is introduced into the absorption column. Preferably, the desiccant material is added to the liquid effluent prior to the chilling stage during which the temperature of the liquid effluent is brought to the temperature of the vapor component exiting the final vapor cooling stage.

The attached drawing is a representative flow scheme suitable for practicing the present invention.

Referring to the drawing in more detail, the gaseous feed stream, e.g., a natural gas-liquids stream, is first passed through line 1 to a liquid-vapor separator 10 for separation into a vapor component and at least one liquid component. In those instances when the gaseous feed stream is at a temperature and pressure and contains moisture in an amount at least sufficient to cause the formation of gas hydrates, a hydrate inhibitor such as methanol is usually added to the gaseous feed stream upstream of the vapor-liquid separator 10. The liquid component from the vapor-liquid separator 10 is retained in a liquid phase separator 12 wherein the organic phase is separated from the aqueous phase containing hydrate inhibitor, if present. Separated aqueous phase containing hydrate inhibitor is passed via conduit 24 to a hydrate inhibitor recovery section, which is not shown and which does not form a part of the invention. The overhead vapor from the liquid-vapor separator 10 is passed through lines 2, 2a or 2b through at least one cooling stage 14 and subsequently introduced into the bottom section of a contactor column 16. When a single cooling stage between the vapor-liquid separator and the contactor column is utilized, a hydrate inhibitor or desiccant material such as ethylene glycol is introduced into the vapor stream upstream of the chiller. Preferably, the vapor stream is chilled stagewise through a train of a least two chillers. It is an essential feature of the invention that the desiccant material be added at least before the vapor stream is passed to the final chilling stage, or stage where the temperature can cause hydrates to form. Thus, when employing multistage chilling of the vapor stream, the presently preferred embodiment desiccant material in the amount of about 1500 gallons per 10 million standard cubic feet of gas is admixed with the gas stream prior to introducing said gas stream into the final chiller and, if desired, additional desiccant material can be added to the vapor or gas component prior to one or more of the preceding chilling stages. The chilled gas, which now contains a hydrate suppressor or desiccant material, is passed from the final chiller 12 through line 3 directly to the bottom section of the contactor tower 16. The hydrocarbon liquid from the liquid phase separator 12 is passed via conduit 4 and/or 4a through one or more chilling stages 14 in order to bring the temperature of the liquid hydrocarbon to the level of the chilled gas exiting the final chiller on the vapor component side and the liquid hydrocarbon, which is now at the same temperature as the vapor component, is introduced via conduit 5 into the contactor tower 16 at a locus above the entry point of the gas stream. Preferably, a desiccant material, supra, is added to the liquid hydrocarbon stream at least before the final chilling stage on the liquid hydrocarbon. Separation in the contactor column 16 takes place to provide an overhead dry gas stream comprising methane, the bottom product being a liquid rich in ethane and heavier hydrocarbons. The introduction of a desiccant material, supra, to near the top of the contactor column 16 via conduit 21 has been found very effective in improving the separation of ethane and heavier hydrocarbons from the gas as well as any hydrate inhibitor which may be present. Dry methane-rich gas is recovered via conduit 22. The bottoms liquid product from contactor 16, which includes desiccant material as well as ethane and heavy hydrocarbons and, when present in the feed to the vapor-liquid separator, hydrate inhibitor, is retained in a liquid phase separator 18 where the desiccant is separated into a heavier liquid phase and passed via conduit 25 to a desiccant recovery section, which is not shown and which does not form a part of the invention. The separated liquid hydrocarbon is passed via conduit 23 to a fractionator system, also not shown, for separation into ethane and various other hydrocarbon fractions.

As an example of the utility of our process, the following tabulation gives stream compositions of the important feed, intermediate and product streams of the process. For comparison purposes the tabulation also shows treatment of a natural gas stream similar to that employed in our process. During the operation of the process, desiccant material is added at points G-1, in the amount of about one gallon per minute per 10,000,000 standard cubic feet of gas per day. For comparison purposes there is provided a material balance of a recovery process operating on the same feedstock employed in our process but without the addition of desiccant material 21 and hydrocarbon recontact in contactor 16.

TYPICAL OPERATION

| | With Invention | Without Invention |
|---|---|---|
| Separator 10: | | |
| Pressure, psia | 550 | 550 |
| Temperature, °F. | 70 | 70 |
| Separator 18: | | |
| Pressure, psia | 540 | 540 |
| Temperature, °F. | −35 | −35 |
| Contactor 16: | | |
| Pressure, psia | 540 | Not Used |
| Temperature, °F. | −35 | |
| Stream 1 (Pound Mols/Day): | | |
| $CO_2$ | 600 | 600 |
| $N_2$ | 2,170 | 2,170 |
| Methane | 62,850 | 62,850 |
| Ethane | 13,660 | 13,660 |
| Propane and heavier | 20,720 | 20,720 |
| Methanol | 92 | 92 |
| Water | 253 | 253 |
| Stream 2b (Pound Mols/Day): | | |
| $CO_2$ | 489 | 489 |
| $N_2$ | 2,114 | 2,114 |
| Methane | 58,297 | 58,297 |
| Ethane | 10,163 | 10,163 |
| Propane and heavier | 7,301 | 7,301 |
| Methanol | 30 | 30 |
| Water | 17 | 17 |
| Stream 5 (Pound Mols/Day): | | |
| $CO_2$ | 111 | 111 |
| $N_2$ | 56 | 56 |
| Methane | 4,553 | 4,553 |
| Ethane | 3,497 | 3,497 |
| Propane and heavier | 13,419 | 13,419 |
| Methanol | 33 | 33 |
| Water | 4 | 4 |
| Stream 24 (Pound Mols/Day): | | |
| Water | 232 | 232 |
| Methanol | 29 | 29 |
| Glycol 21, Gallons/Day[2] | 14,400 | Not Used[1] |
| Glycol G-1, Gallons/Day[2] | 4,800 | 4,800 |
| Dry Gas 22 (Pound Mols/Day): | | |
| $CO_2$ | 235 | 339 |
| $N_2$ | 1,975 | 2,048 |
| Methane | 46,628 | 52,659 |
| Ethane | 4,042 | 5,953 |
| Propane and heavier | 1,274 | 1,607 |
| Methanol | 4.8 | 4.7 |
| Water | 0.2 | 0.3 |
| Mol % Methane | 86.1 | 84.1 |
| Liquid Hydrocarbon 23 (Pound Mols/Day): | | |
| $CO_2$ | 365 | 260 |
| $N_2$ | 195 | 122 |
| Methane | 16,222 | 10,190 |
| Ethane | 9,618 | 7,707 |
| Propane and heavier | 19,426 | 19,113 |
| Methanol | 3.3 | 34.5 |
| Water | 0.5 | 4.2 |

(1) Contact tower 16 not used in prior operation. In prior operation, the chilled gas was charged to the separator 18, vapor was removed, and the liquid hydrocarbon was separated and was added to the liquid hydrocarbon from separator 12 as total liquid hydrocarbon product.
(2) Aqueous ethylene glycol, 70 wt. % ethylene glycol−30 wt. % water was used. The temperature of the glycol stream 21 was −35° F.

From the above data, it can be seen that when operating in accordance with the invention the dry gas (stream 22) of the invention is richer in methane (86.1 mol per cent methane) and contains less ethane and heavier components. Also it can be seen that the liquid product (stream 23) of the invention contains less methanol (3.3 pound mols per day) and less water (0.5 pound mol per day) as compared with the prior operation not using the invention.

While certain embodiments of the invention have been described for illustrative purposes, the invention is not limited thereto. Various other modifications or embodiments of the invention will be apparent to those skilled in the art in view of this disclosure. Such modifications or embodiments are within the spirit and scope of the disclosure.

We claim:

1. The method for separating condensible hydrocarbon liquids from a natural gas stream under superatmospheric pressure comprising:
   a. passing said natural gas stream to a vapor-liquid separator;
   b. separating said natural gas stream into vapor and liquid components;
   c. admixing said vapor component from (b) with a desiccant material;
   d. passing said desiccant material-containing vapor component through heat exchange means to reduce the temperature of said vapor;
   e. passing said cooled desiccant-containing vapor to the lower portion of a contact tower;
   f. passing said liquid component from (b) through heat exchange means to bring the temperature of said liquid component to a temperature level in the range of the cooled vapor component exiting the heat exchange means of (d);
   g. passing said liquid component exiting said heat exchange means of (f) to said contact tower of (e) at a locus above the point of entry of said vapor component;
   h. recontacting said vapor and liquid components in said contact tower; and
   i. separating said recontacted vapor-liquid components into an overhead vapor product stream rich in methane and a bottoms liquid product stream rich in ethane and heavier hydrocarbon liquids and desiccant material.

2. A method according to claim 1 further comprising admixing with said natural gas stream a gas hydrate inhibitor prior to passing said natural gas stream to said vapor-liquid separator.

3. A method according to claim 1 further comprising introducing into said contact column a desiccant material at a locus above the point of entry of the liquid component of step (g).

4. A method according to claim 2 further comprising introducing into said contact column a desiccant material at a locus above the point of entry of the liquid component of step (g).

5. A method according to claim 3 further comprising admixing with said natural gas stream a gas hydrate inhibitor prior to passing said natural gas stream to said vapor-liquid separator.

6. A method according to claim 1 further comprising admixing with said liquid component from (b) a desiccant material prior to passing said liquid component through said heat exchange means of step (f).

7. A method according to claim 1 wherein said heat exchange means of step (d) comprises a train of two or more heat exchangers in series and a desiccant material is added to said vapor component prior to passing said vapor component through the ultimate of said heat exchange means.

8. A method according to claim 7 further comprising admixing with said natural gas stream a gas hydrate inhibitor prior to passing said natural gas stream to said vapor-liquid separator.

9. A method according to claim 8 further comprising admixing with said liquid component from (b) a desiccant material prior to passing said liquid component through said exchange means to step (f).

10. A method according to claim 9 further comprising introducing into said contact column a desiccant material at a locus above the point of entry of the liquid component of step (g).

* * * * *